United States Patent
DiStefano

(10) Patent No.: US 7,164,580 B2
(45) Date of Patent: Jan. 16, 2007

(54) PLENUM-BASED COMPUTER COOLING SYSTEM

(75) Inventor: Eric DiStefano, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 10/397,985

(22) Filed: Mar. 25, 2003

(65) Prior Publication Data

US 2004/0190243 A1 Sep. 30, 2004

(51) Int. Cl.
*G06F 1/20* (2006.01)

(52) U.S. Cl. .................. 361/687; 361/690; 165/121

(58) Field of Classification Search ............... 361/687, 361/690–692, 695, 717–719, 683; 165/80.2–80.3, 165/121
See application file for complete search history.

(56) References Cited

U.S. PATENT DOCUMENTS

| | | | | |
|---|---|---|---|---|
| 6,082,623 | A | * | 7/2000 | Chang ...................... 236/49.3 |
| 6,134,667 | A | * | 10/2000 | Suzuki et al. ............... 713/300 |
| 6,525,935 | B1 | * | 2/2003 | Casebolt ..................... 361/687 |

* cited by examiner

*Primary Examiner*—Yean-Hsi Chang
(74) *Attorney, Agent, or Firm*—Blakely, Sokoloff, Taylor & Zafman LLP

(57) ABSTRACT

A system for using a plenum to cool components of the system is described. The plenum distributes air to local hot spots of the system which are remote from a fan source. A central processing fan, a separate system fan, or an external air source may be used to generate the air to be distributed.

24 Claims, 3 Drawing Sheets

PLENUM-BASED COMPUTER COOLING SYSTEM

FIELD OF THE INVENTION

The present invention pertains to the field of computer design. More particularly, the present invention relates to a method for cooling a computer system using a plenum with orifices over selected components.

BACKGROUND OF THE INVENTION

A computer system typically comprises a plurality of electronic components. Such components may include a central processing unit (CPU), a chipset, and a memory. During operation, the components typically dissipate heat. In addition, the conversion of AC input power to DC is also known to generate heat in a computer system. If the CPU, or any other electronic component, becomes overheated, performance may suffer and the component's life may be depreciated.

A fan is often used to cool electronic components of a computer system. One common cooling method is pressurization. In pressurization, fresh air is provided directly to the fan from the outside. The air is then pushed over the computer components with a fan.

Another common cooling method is evacuation or evacuating flow. In evacuation, air is provided to the computer system, dragged over the components, and then fed to a fan. The fan then pushes the air out of the system.

BRIEF DESCRIPTION OF THE DRAWINGS

The embodiments of the present invention are illustrated by way of example and not in the figures of the accompanying drawings, in which like references indicate similar elements and in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The placement of components on a motherboard for one computer system may be different from the placement of components for another computer system. For example, a first chipset on a first motherboard may be located near the CPU fan in a pressurized cooling system. In contrast, a second chipset on a second motherboard may be located at a location away from the CPU fan. Thus, because the second chipset is farther away from the CPU fan, the second chipset may be more difficult to cool than the first chipset. The traditional cooling system of a computer system pushes or pulls air through the system in an arbitrary fashion regardless of the location of the components that require cooling.

Figure 1:
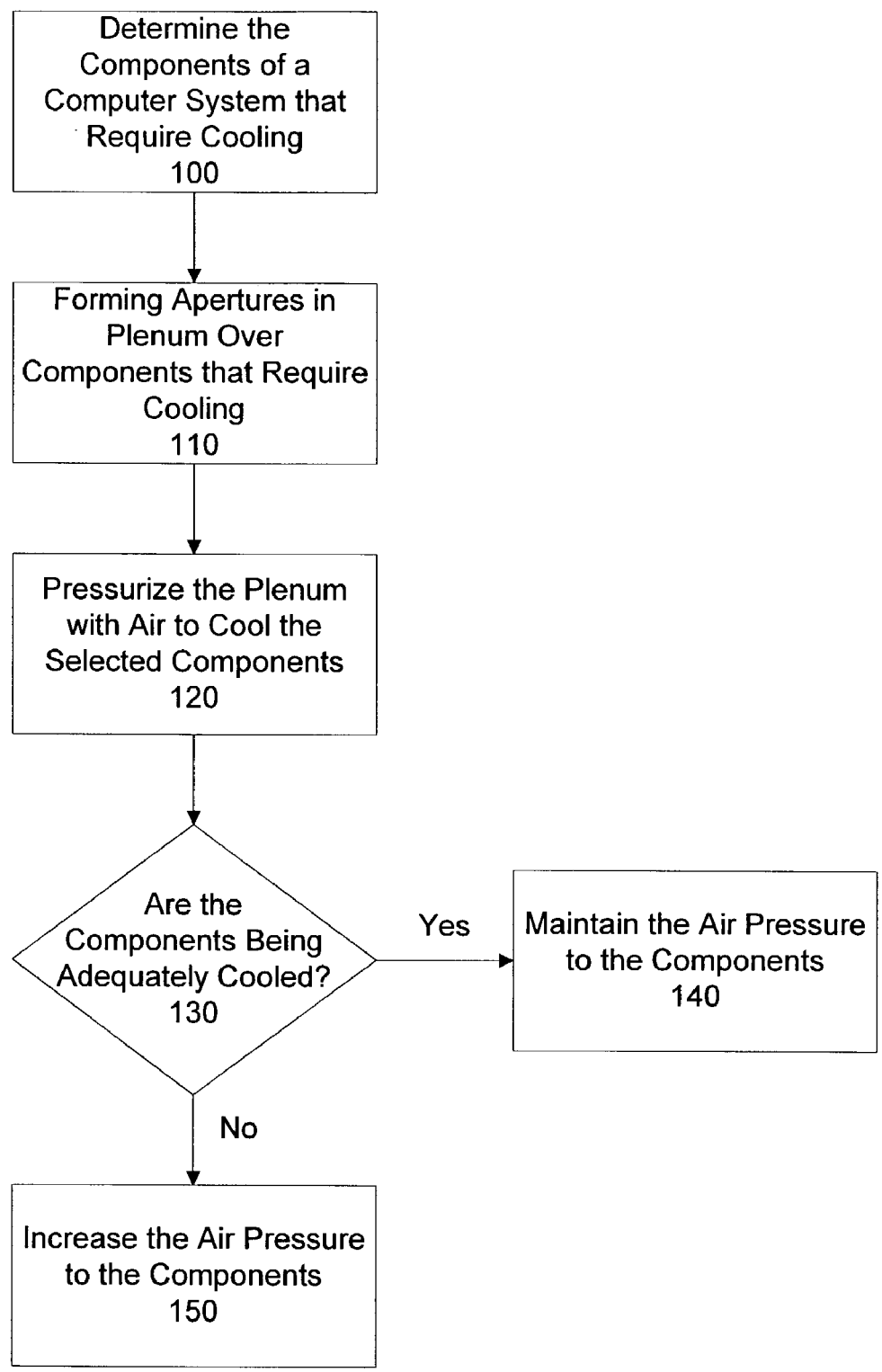
FIG. 1 is a flowchart for implementing an embodiment of a plenum-based computer cooling system.

For one embodiment of the invention, cool air is supplied by a plenum to each component of a computer system that requires cooling. The plenum may be plastic, metal, a polyester film such as Mylar, or any other material capable of distributing air. A flowchart of this embodiment of the invention is depicted in FIG. 1. The computer system may be a laptop or a desktop computer.

Figure 2:
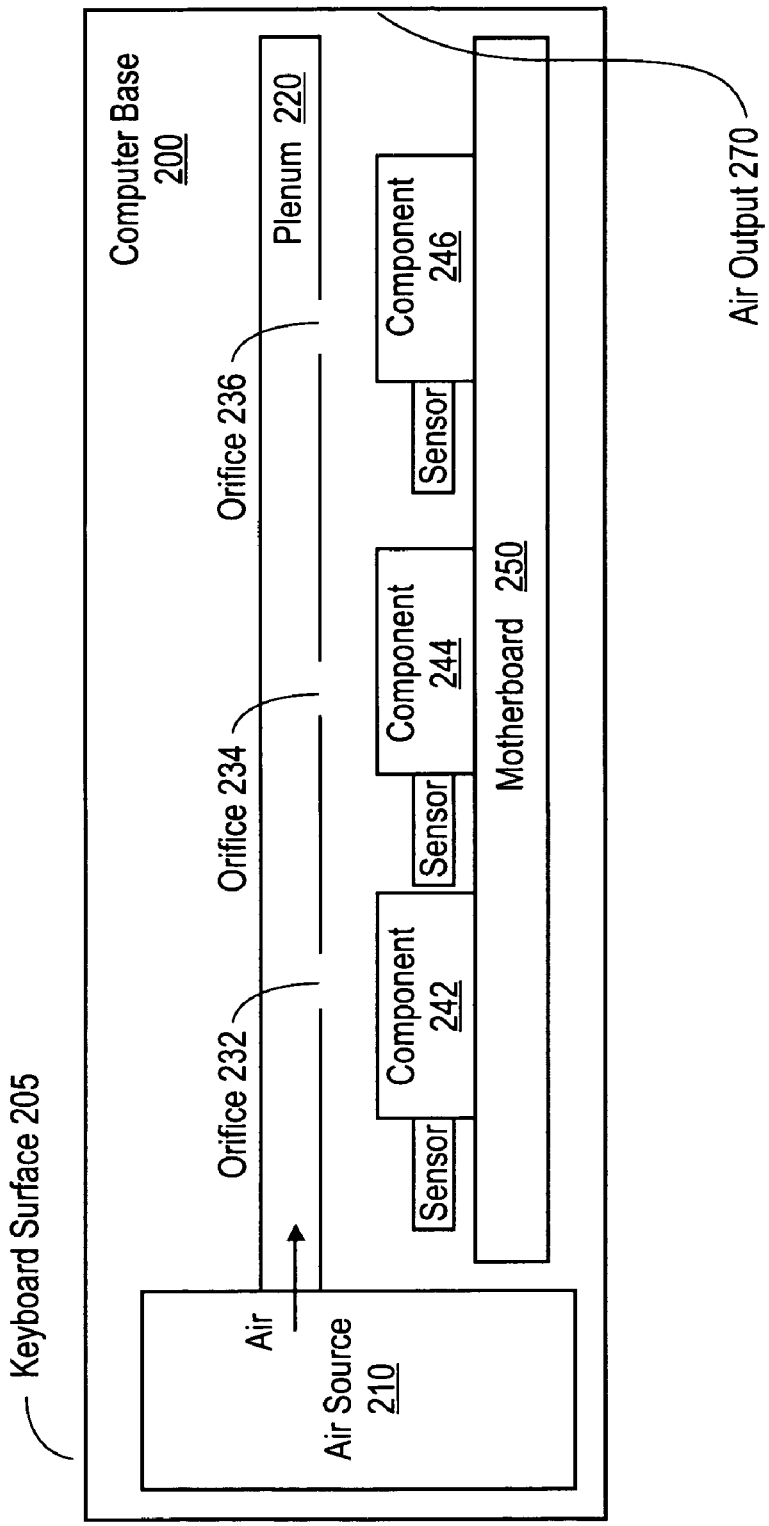
FIG. 2 is a side view of an embodiment of a computer system that utilizes plenum-based cooling.

In operation 100, the locations of components of the computer system that require cooling are determined. The plenum is located above the components as shown in FIG. 2. The location of the plenum in the computer system with respect to other parts of the computer system will be described in further detail below. Apertures are formed in the plenum in operation 110 over the components that require cooling. The size of each aperture may depend on the cooling requirements of the corresponding component to be cooled. For example, a larger orifice may be needed to cool a component that generates a high heat load than a component that generates a moderate heat load. Thus, the cooling requirements of each component may be considered when sizing the apertures.

The plenum is then pressurized with air to cool the selected components in operation 120. Operation 130 determines if the components are being adequately cooled. A thermostat or heat sensor may be used to track the temperature of each of the components. If the components are being adequately cooled, then the air pressure is maintained to each of the components in operation 140. If one of the components is not being adequately cooled, the plenum air pressure is increased in operation 150.

FIG. 2 depicts a side view of the base 200 of a computer system having a plenum-based cooling system. For this embodiment of the invention, the computer system is a laptop computer. The motherboard 250 is located inside the computer base 200. The top of the laptop base is known as the keyboard surface 205 because the keyboard rests on top the base 200. The motherboard 250 is coupled to a plurality of components 242, 244, and 246. Plenum 220 is located above each of the components 242, 244, and 246. The plenum 220 is coupled to an air source 210. Air source 210 generates air to the plenum 220, which is then used to cool the components 242, 244, and 246. The air source pressurizes the plenum 220 with air such that the plenum orifices 232, 234, and 236 distribute air uniformly to each of the components that require cooling. The air source 210 may comprise a fan. For example, the CPU fan, a separate system fan, or an external fan may be used as the air source 210. Alternatively, the air source 210 may comprise a compressor or a pump to generate the air. The compressor may generate refrigerated air to be distributed by the plenum 220 to specific system components.

Specifically, the plenum 220 comprises orifices 232, 234, and 236 above each component. Air released from orifice 232 cools component 242; air released from orifice 234 cools component 244; and air released from orifice 236 cools component 246. The invention is not limited to a system having three components that require cooling. For example, a computer system may have a plenum having 10 orifices, which cool 10 corresponding components. Finally, the air used to cool the components is released from the computer base 200 via an air output 270.

Figure 3:
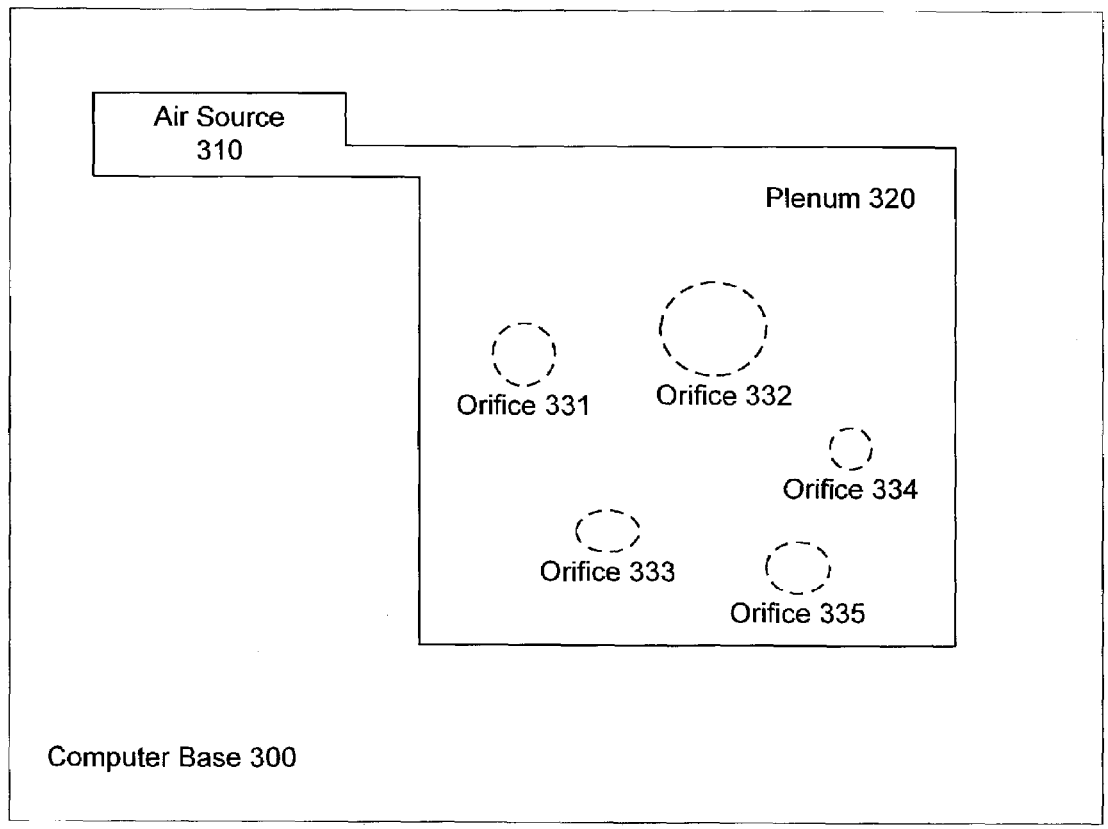
FIG. 3 is an overhead view of an embodiment of a computer system that utilizes plenum-based cooling.

FIG. 3 depicts a top view of the inside of the base 300 of a computer system having a plenum-based cooling system. The air source 310 is coupled to a plenum 320. The bottom of the plenum 320 comprises orifices 331–335. The air source 310 generates cold air to be distributed by the plenum 320. The orifices 331–335 are each directly above a motherboard component that requires cooling.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A computer system, comprising:
    a first component and a second component;
    a motherboard coupled to the first component and the second component, wherein the motherboard enables communication between the first component and the second component;
    a plenum having a first orifice directly over the first component and a second orifice directly over the second component, wherein the plenum distributes air to cool the first component and the second component, wherein the predominant flow of air is substantially perpendicular to the plane of the motherboard and directed onto the surface of the first and second components;
    a first sensor to detect a temperature of the first component;
    a second sensor to detect a temperature of the second component; and
    an air source, coupled to the plenum and the sensor, to pressurize the plenum with air, wherein the air source increases the plenum air pressure if the first component has a temperature above a first cooling requirement or if the second component has a temperature above a second cooling requirement, and wherein the air source maintains the plenum air pressure if the first component temperature is not above the first cooling requirement and if the second component temperature is not above the second cooling requirement.

2. The computer system of claim 1, wherein a size of the first and second orifices depend on the first and second cooling requirements, respectively.

3. The computer system of claim 1, wherein the air source is a compressor.

4. The computer system of claim 3, wherein the air source generates refrigerated air.

5. The computer system of claim 1, wherein the air source is a fan.

6. The computer system of claim 1, wherein the first component is a central processing unit.

7. The computer system of claim 1, wherein the second component is a chipset.

8. The computer system of claim 1, further comprising a memory coupled to the motherboard, wherein the plenum comprises a third orifice over the memory to cool the memory.

9. The computer system of claim 1, wherein the plenum comprises plastic.

10. The computer system of claim 9, wherein the plenum comprises a material selected from group consisting of polyester, Mylar, and any combination thereof.

11. The computer system of claim 1, wherein the system is a laptop computer.

12. The computer system of claim 1, wherein the system is a desktop computer.

13. The computer system of claim 1, wherein the location of at least one orifice is directly above a component and off-centered in a direction upwind from an exhaust port.

14. The computer system of claim 1, wherein the sensor comprises a thermostat.

15. The computer system of claim 1, wherein the predominant flow of air substantially perpendicular to the surface of at least one component results in turbulent flow over the surface of the at least one component.

16. An apparatus, comprising:
    a means for distributing air to local hot spots of a computer system, which are located on at least one or more planes and remote from an air source, wherein the distributed air predominantly flows substantially perpendicular to the at least one or more planes of the hot spots;
    a means for sensing temperatures of each of the local hot spots;
    a means for increasing air flow if at least one of the local hot spots has a temperature above a cooling requirement; and
    a means for maintaining air flow if each of the local hot spots have temperatures not above their respective cooling requirements.

17. The apparatus a claim 16, further comprising a means for forming in a plenum, at least one or more orifices directly over at least one or more of the local hot spots which require cooling.

18. The apparatus a claim 16, wherein the means for distributing air to local hot spots are proportional to the cooling requirements of the local hot spots.

19. The apparatus a claim 16, wherein the means for distributing air generates turbulent flow on at least one or more surfaces of the local hot spots.

20. The apparatus a claim 16, further comprising:
    a means for generating air to distribute to the local hot spots.

21. A method, comprising:
    providing a computer system having a plurality of components;
    determining at least two or more components of the computer system that require cooling;
    forming at least two or more orifices in a plenum directly over the at least two or more components that require cooling;
    sensing temperatures of each of the at least two or more components that require cooling;
    pressurizing the plenum with air to cool the components by flowing air from the plenum directly onto the at least two or more components requiring cooling;
    determining if the components to be cooled are being adequately cooled, as measured by their respective sensed temperatures;
    increasing the air pressure of the plenum if at least one of the components that requires cooling is not being adequately cooled, as measured by its sensed temperature; and
    maintaining the air pressure of the plenum if all the components requiring cooling are being adequately cooled, as measured by their respective temperatures.

22. The method of claim 21, wherein the size of each orifice depends on the cooling requirement of each corresponding component requiring cooling.

23. The method of claim 21, wherein at least one or more orifices generate air flow which is predominantly perpendicular to and directed toward the surface of the component requiring cooling.

24. The method of claim 23, wherein the air flow perpendicular to the surface of at least one or more component requiring cooling comprise turbulent air flow on the surface of the at least one or more components requiring cooling.

* * * * *

UNITED STATES PATENT AND TRADEMARK OFFICE
CERTIFICATE OF CORRECTION

PATENT NO. : 7,164,580 B2  
APPLICATION NO. : 10/397985  
DATED : January 16, 2007  
INVENTOR(S) : DiStefano Page 1 of 1

It is certified that error appears in the above-identified patent and that said Letters Patent is hereby corrected as shown below:

In column 4, at line 9, delete "at least one or".

In column 4, at line 10, delete "more planes" and insert --a surface of a printed circuit board (pcb),--.

In column 4, at line 12, delete "the at least one or more planes of".

In column 4, at line 13, after "spots" insert --on the surface of the pcb--.

In column 4, at line 35, after "component" insert --mounted on a printed circuit board (pcb)--.

In column 4, at line 40, after "cooling" insert --wherein the at least two or more orifices facing in a direction perpendicular to a surface of the pcb;--.

Signed and Sealed this

Twenty Second Day of April, 2008

JON W. DUDAS  
*Director of the United States Patent and Trademark Office*